May 30, 1967   L. A. WARNER   3,323,041
APPARATUS HAVING A PAIR OF LAMP INDICATORS AND TERMINAL MEANS
FOR INSERTION INTO A STANDARD ELECTRICAL OUTLET TO TEST FOR
LINE VOLTAGE, SHORT CIRCUITS, POLARITY AND THE LIKE
Filed Feb. 24, 1966
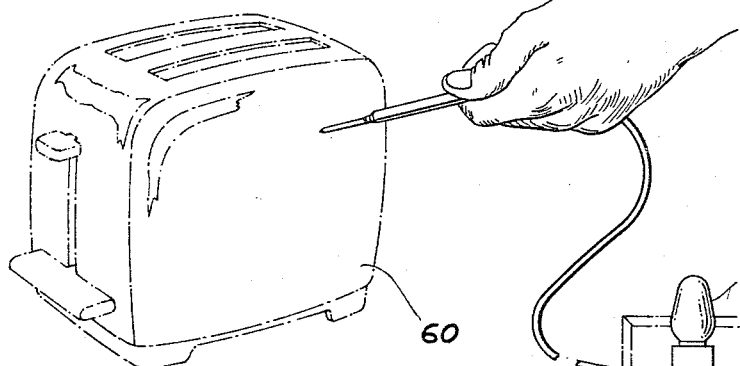
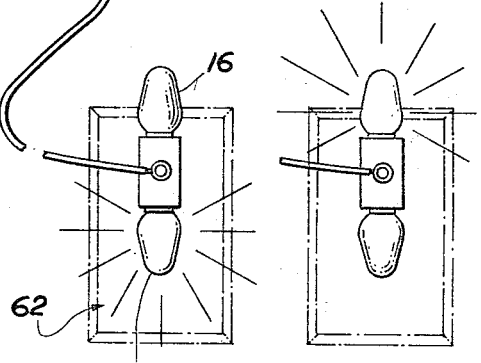
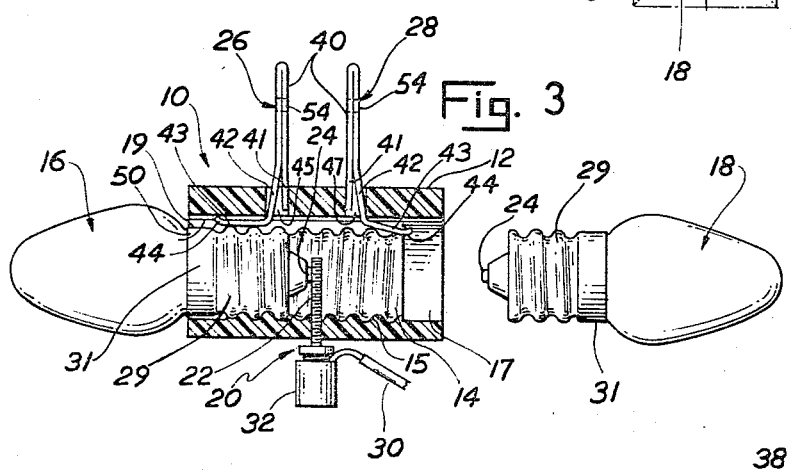
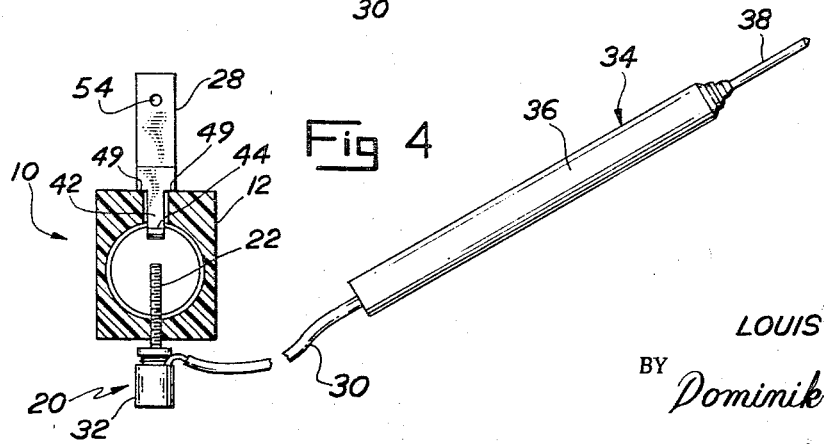
INVENTOR.
LOUIS A. WARNER
BY Dominik & Stein
ATTORNEYS 3,323,041
APPARATUS HAVING A PAIR OF LAMP INDICATORS AND TERMINAL MEANS FOR INSERTION INTO A STANDARD ELECTRICAL OUTLET TO TEST FOR LINE VOLTAGE, SHORT CIRCUITS, POLARITY AND THE LIKE
Louis A. Warner, 5223 N. Natoma, Chicago, Ill. 60656
Filed Feb. 24, 1966, Ser. No. 529,844
2 Claims. (Cl. 324—51)

This invention relates to an improved test light for testing electrical circuits and apparatus, for such things as line voltage, short-circuits, polarity and the like.

Neon test lights are generally well known and have been used for some time for testing electrical circuits and apparatus for a whole host of conditions. In some of these tests, considerable manipulation is required to assure that a correct indication is obtained with the neon light. For example, in testing an appliance or other apparatus for a short-circuit, one lead of the neon light is touched to the appliance and the other lead is touched to a ground. If the neon light lights, this is an indication that there is presently a short-circuit between the "hot" side of the line and the appliance. If, however, the neon light doesn't light, this can mean one of three things. The neon light may be defective, thus it must be tested to determine that it is functioning properly. If the neon light is working, the fact that it didn't light could mean that the appliance is not defective, but it could also mean that a short-circuit, if one exists, is between the "ground" side of the line and the appliance. Therefore, still another test must be made. The grounded lead of the neon light is either touched to the "hot" side of the line to determine whether it lights, or the appliance's plug is reversed in the electrical outlet and the appliance tested in the first described manner. The latter choice is usually preferred since the outlet's cover plate generally must be removed to gain access to the "hot" side of the line.

The test light of the present invention can be used to test any electrical circuit and apparatus which can be tested with a neon test light, for the same conditions. The test light is plugged into an electrical outlet and, to test for, for example, a short-circuit in an electrical apparatus, its probe or test lead is merely touched to the apparatus. A positive indication of the existence of a short-circuit, as well as the type of short-circuit, that is, whether the appliance is short-circuited with the "hot" or "ground" side of the line, is provided. The need for manipulating it to perform several tests in the manner described above in the case of a neon test light is therefore eliminated. Other obvious advantages of the test light will be apparent from the detailed description below.

Accordingly, it is an object of the present invention to provide improved test lights for testing electrical circuits and apparatus.

Another object is to provide improved test lights which may be used for testing electrical apparatus for short-circuits and which, in one test, will provide a positive indication of the presence or absence of a short-circuit. In this respect, it is further contemplated that the test light provide a positive indication of the particular type of existing short-circuit, that is, whether the "hot" or the "ground" side of the line is short-circuited with the apparatus.

Still another object is to provide an improved test light which can be used to perform all tests which generally can be performed with a neon test light.

Still another object is to provide an improved test light which uses ordinary, commercially available light bulbs, so that the light bulbs can be replaced, if damaged or burned-out, to extend the useful life of the test light.

And still another object is to provide an improved test light which is relatively simple in construction, and relatively inexpensive to manufacture. In this respect, it is contemplated that the test light be easily assembled.

Other objects of the invention will in part be obvious and will in part appear hereinafter.

The above objectives are accomplished with a test light which comprises, generally, a socket having a threaded aperture therein for supporting two light bulbs in an end-to-end abutting relationship and a terminal which extends into the aperture and is engaged by the base contacts of the pair of light bulbs receive therein. A test lead having a probe on its end is affixed to the terminal. The socket is further adapted to be plugged into a conventional electrical outlet. When the test light is plugged into an outlet both light bulbs will light, thus indicating there is line voltage at the outlet. Also, when the probe is touched to an appliance or the like to check for a short-circuit, one or the other of the two lights will go out if there is a short-circuit. By determining the polarity of the test light, a positive indication can be obtained of the type of short-circuit existing, by observing which one of the two light bulbs is extinguished. The socket's plug is preferably polarized, for this reason.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawing, in which:

FIG. 1 is a view illustrating the test light plugged into an electrical outlet, and the manner in which it is used to test an electrical appliance for a short-circuit;

FIG. 2 is a view of the test light plugged into an electrical outlet, illustrating the manner in which it provides a positive indication of a test;

FIG. 3 is a side elevation view, of the test light, partly sectioned to illustrate its construction; and FIG. 4 is a transverse vertical sectional view of the test light of FIG. 3.

Similar reference characters refer to similar parts throughout the several views of the drawing.

Referring now to the drawing, and particularly FIGS. 3 and 4 thereof, a test light 10 exemplary of the invention is illustrated including a socket 12 having a threaded aperture 14 therein supporting a pair of light bulbs 16 and 18 in an end-to-end relationship. A terminal 20 having a threaded prong 22 is affixed to the socket 12, with the prong 22 extending into the aperture 14 between the light bulbs 16 and 18 so as to be engaged by their base contacts 24. A pair of terminals 26 and 28, forming a conventional male plug, are in electrical contact with the shell contacts 29 of the bulbs. The bulbs 16 and 18 are thereby connected in series between the terminals 26 and 28, by means of the prong 22, and when the terminals are plugged into a conventional electrical outlet, one-half of the line voltage will be applied across each of the bulbs 16 and 18. The individual bulbs are preferably commercial ones, designed to operate at line voltage (normally 110 volts). Each bulb, therefore, will operate at approximately one-fourth its rated power.

The terminal 20 also has an aperture (not shown) formed in its end for receiving the insulation-free end of a flexible insulated conductor 30. A cap 32 is threadedly received on the end of the terminal, for securing the end of the conductor 30 in the aperture. The conductor 30 is preferably of long length, for reasons which are apparent from the description below, and has a probe 34 affixed to its end having an insulated body 36 and a conductive tip 38 which is electrically affixed to the conductor 30.

The socket 12 and the cap 32 are made of a dielectric material, preferably a thermosetting plastic which has high strength and can be readily machined. Aperture 14 extends through the socket 12 and is formed with threads 15 to mate wth the threaded shell contacts 29 of the bulbs 16 and 18. Unthreaded recesses 17 and 19 are preferably formed at the ends of the aperture 14 to receive the unthreaded portions 31 of the shell contacts. Accordingly, no conducting portion of the bulbs are exposed, thus precluding any shock hazard.

The terminals 26 and 28 each may be formed from a single strip of conducting material folded over to form a double thickness prong 40, which extends upwardly in a straight section 41 and an angled section 42. The section 41 terminates in a reduced stub portion, while the section 42 has a portion forming a substantially horizontally extending contact 43. The contact 43 is arched in an upwardly convex curve and has a downwardly extending lip 44 on its outer end.

The stub portions of the sections 41 and the contacts 43 extend into slotted apertures 45 and 47 communicating with the aperture 14. Shoulders 49 abut the socket 12 to prevent entry of the prongs 40 into the apertures. The lips 44 bear against the bottom of a longitudinal slot 50 in the socket 12, with the contacts 43 above the slot so as to engage the shell contacts 29 of the bulbs 16 and 18. The arched form of the contacts 29 provides a spring action when the bulbs are screwed into aperture 14, the contacts being depressed downward, as can be seen in FIG. 3, to maintain a firm, resilient engagement with the shell contacts of the bulbs. One of the prongs 40 is also preferably larger in width than the other so that the socket can only be plugged into a polarized electrical outlet, in a predetermined direction to polarize the test light.

To use the test light 10 to determine the presence of line voltage at an electrical outlet, the test light is merely plugged into it, and if the light bulbs 16 and 18 light, this is an indication that there is line voltage present. To test an electrical conductor for line voltage, the two wires of the conductor are inserted into respective ones of the apertures 54 formed in the prongs, to make electrical contact with them. If line voltage is present, both bulbs should light. Alternatively, one of the conductor's wires can be inserted into the aperture in one of the prongs and the tip 38 of the probe 34 touched to the other wire. In this case, only the bulb 16 or 18 will light, depending upon which of the two prongs 40 the wire is engaged with.

To test an electrical appliance, such as the toaster 60, in FIG. 1, the test light 10 is plugged into an electrical outlet, generally represented by the reference numeral 62. The toaster 60 also, of course, is energized. When the test light is plugged in, both bulbs 16 and 18 should light, thus indicating that the test light is working properly. If neither of the bulbs light, this is a positive indication that one of the bulbs is defective and should be replaced. An immediate indication is therefore provided, as to the operability of the test light.

The tip 38 of the probe 34 is next touched to the toaster, as illustrated. If a short-circuit exists between the electrical wiring and the appliance, one of the bulbs 16 or 18 will be extinguished, thus providing a positive indication of this condition. Since the test light is polarized, by observing which of the two bulbs 16 or 18 is extinguished it can be immediately determined what type of short-circuit, i.e. a short-circuit to the "hot" or the "ground" side of the line, exists. To assist in this determination, the bulbs each can be colored differently, and the colors can advantageously be red and green to indicate a "dangerous" electrical hazard and a "safe" electrical hazard, respectively. The socket 12 also can be provided with appropriate markings, to provide the same indication. For example, in FIGS. 1 and 2, respectively, the bulb 16 may be green and the bulb 18 red. If the bulb 16 is extinguished, it is immediately apparent that there is a short-circuit and that it is between the "hot" side of the line and the appliance and therefore "dangerous." If the bulb 18 is extinguished, as indicated in FIG. 2, it is immediately apparent that there is a "short-circuit," but it is between the "ground" side of the line and the appliance and, although it is an electrical hazard, it is "safe," in the sense that upon touching the toaster and a ground an electrical shock will not be received.

In the event the electrical outlet and/or the test light 10 is not polarized so that a ready indication of the type of short-circuit which exists is provided, the test probe 34 can be grounded and it can be observed which of the two bulbs 16 and 18 is extinguished. If the green bulb is extinguished, the test light can be reversed in the electrical outlet so that the red light is extinguished, thereby effectively polarizing the test light so that a proper indication is provided. Of course, the test light need not be reversed. The appliance can be tested and a determination made by observing whether the same or the other of the two bulbs is extinguished.

The conductor 30 is preferably sufficiently long in length so that appliances which are at a distance from an electrical outlet can be tested. The light 10, however, can be plugged into an extension cord so that it can be used at virtually any distance from an electrical outlet. When used in this manner, the test light 10 and/or the extension cord can be polarized, in the above described manner, so as to provide a proper indication.

In testing the toaster 60, or any electrical appliance for short-circuits, if both bulbs 16 and 18 remain lighted when the probe 34 is touched to the toaster, this is a positive indication that it is not defective.

The two light bulbs 16 and 18 are connected in series, hence they operate at one-half their design voltage and should have a relatively long useful life. Also, if one or both of them become defective, they can simply be replaced. The test light 10 therefore also has a long useful life. While bulbs having screw-type bases are illustrated, it is apparent that bulbs having bayonet-type bases can also be used and the socket 12 formed accordingly. Furthermore, a screw-type base for insertion into a conventional bulb socket can be substituted for the prong-type plug.

It will thus be seen that the objects set forth above, among those made apparent from the preceding description, are effieciently attained and, since certain changes may be made in the above construction without departing from the scope of the invention, it is intended that all matter contained in the above description or shown in the accompanying drawing shall be interpreted as illustrative and not in a limting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A test light consisting of a polarized socket having a pair of bayonet type electrical terminals affixed directly to it which are adapted for insertion into standard electrical outlets, a single test probe, a pair of light bulbs, said pair of light bulbs each having a base contact and a shell contact and removably affixed wtihin said socket with said bases in end-to-end relationship, said pair of electrical terminals each extended into said socket and engaged by respective ones of said shell contacts on said light bulbs, a test probe terminal affixed to the exterior of said socket and extended into it and positoned between and directly engaged by said base contacts on both of said light bulbs to connect said light bulbs in series between said electrical terminals, and test probe means removably affixed to said test probe terminal, said light bulbs each giving an indication of a test result when said electrical terminals are inserted into an electrical outlet and said test probe is engaged with an object to be tested.

2. The test light of claim 1 wherein said light bulbs are each colord differently to give an indication of a test result.

References Cited

UNITED STATES PATENTS

| | | | |
|---|---|---|---|
| 1,241,874 | 10/1917 | Miller et al. | 330—165 X |
| 2,049,224 | 7/1936 | Ribble et al. | 324—51 X |
| 2,053,589 | 9/1936 | Weritz | 339—165 |
| 2,186,212 | 1/1940 | Scoggin | 324—51 |
| 2,195,975 | 4/1940 | Ribble et al. | 324—51 X |
| 2,548,991 | 5/1951 | McNabb | 324—51 |
| 2,851,659 | 9/1958 | Ladrick | 324—51 X |
| 3,019,407 | 1/1962 | Donsky | 339—155 |

OTHER REFERENCES

Loewe, Check That Ground, Allis Chalmers Electrical Review, Second Quarter 1948 FIGS. (2a and 3a).

WALTER L. CARLSON, *Primary Examiner.*

RUDOLPH V. ROLINEC, *Examiner.*

G. R. STRECKER, *Assistant Examiner.*